United States Patent [19]

Ando et al.

[11] Patent Number: 5,411,451
[45] Date of Patent: May 2, 1995

[54] CONTROL SYSTEM FOR CONTROLLING THE PRESSURE OF THE ONCOMING SERVO HYDRAULIC PRESSURE BASED ON A PREDICTED TIME TO SYNC FROM OUTPUT SHAFT ACCELERATION IN AUTOMATIC TRANSMISSION

[75] Inventors: Masahiko Ando, Okazaki; Koji Noda, Anjo; Yoshihisa Yamamoto, Nishio; Masahiro Hayabuchi, Anjo; Kazumasa Tsukamoto, Toyota; Yasuo Hojo, Nagoya; Yutaka Taga; Hidehiro Oba, both of Aichi; Seitoku Kubo, Toyota, all of Japan

[73] Assignee: Aisin AW Co., Ltd., Japan

[21] Appl. No.: 982,673

[22] Filed: Nov. 27, 1992

[30] Foreign Application Priority Data

Dec. 3, 1991 [JP] Japan .................. 3-344123

[51] Int. Cl.⁶ .................................. F16H 5/40
[52] U.S. Cl. ........................ 477/144; 477/148; 477/146; 477/154
[58] Field of Search ........... 74/867, 868; 364/424.1; 477/144, 145, 146, 148, 149, 154, 155, 156

[56] References Cited

U.S. PATENT DOCUMENTS

| | | | |
|---|---|---|---|
| 4,653,350 | 3/1987 | Downs et al. | 74/866 |
| 5,046,174 | 9/1991 | Lentz et al. | 477/144 X |
| 5,046,383 | 9/1991 | Butts et al. | 74/866 |
| 5,079,970 | 1/1992 | Butts et al. | 74/867 X |

FOREIGN PATENT DOCUMENTS 4872552 9/1973 Japan.

*Primary Examiner*—Dirk Wright
*Assistant Examiner*—Khoi Q. Ta
*Attorney, Agent, or Firm*—Lorusso & Loud

[57] ABSTRACT

A control system is provided for servo hydraulic pressure in an automatic transmission. Upon downshifting, one of first and second frictional engagement devices is released while the other is engaged. A directional control valve is provided to feed or drain servo hydraulic pressure to selectively engage or release the first and second devices. The hydraulic pressure is regulated by a pressure regulator under the control of an electronic control unit. Detectors are also provided to determine input rotation and torque, respectively. The regulator is interposed between the directional control valve and the engaged device. The regulator is controlled to maintain the servo hydraulic pressure at a predetermined value under the control of the electronic control unit until predetermined input rotation is detected and then to gradually raise the servo hydraulic pressure under the control of the electronic control on the basis of the value of input torque.

4 Claims, 3 Drawing Sheets

CONTROL SYSTEM FOR CONTROLLING THE PRESSURE OF THE ONCOMING SERVO HYDRAULIC PRESSURE BASED ON A PREDICTED TIME TO SYNC FROM OUTPUT SHAFT ACCELERATION IN AUTOMATIC TRANSMISSION

BACKGROUND OF THE INVENTION (1) Field of the Invention

This invention relates to a control system for an automatic transmission, especially to a control system for servo hydraulic pressure adapted to have frictional engagement means engaged or released for changing the gear position of an automatic transmission.

(2) Description of the Related Art

An automatic transmission mounted on a vehicle is generally provided with plural planetary gear mechanisms. Upon shifting the speed, shifting elements (gears, carriers, ring gears) of these planetary gear mechanisms are selectively connected in accordance with engagement or release of frictional engagement means to establish plural speed stages. In such a transmission, friction elements of the respective frictional engagement means are selectively brought into engagement upon shifting from a particular speed stage to a speed stage lower than the particular speed stage, for example, from a 3rd speed to a 2nd speed.

Such a shifting operation as described above has heretofore been conducted using an orifice kick-down valve. Govenor pressure and spring load are applied in a mutually opposing relationship against a spool of the valve. Feeding of servo pressure on an engaging side is effected through a large-diameter orifice at a vehicle speed not higher than a predetermined level but through a small-diameter orifice at a vehicle speed higher than the predetermined level, whereby the friction element on the engaging side is promptly brought into engagement near a point where the number of input revolutions synchronizes with the number of revolutions of an intended speed stage. (see Japanese Patent Publication No. SHO 52-18344).

According to the above-described conventional technique, however, the feeding of servo pressure to the frictional engagement means on the engaging side is effected under the two-step control by the change-over of the orifices irrespective of throttle opening or the extent of drainage of the servo pressure for the frictional engagement means on the releasing side. The point of synchronization therefore varies substantially depending on the vehicle speed and engine characteristics, leading to the problem that the engine may be caused to idle at an excessively high speed or a large shift shock may occur due to excessive tie-up. Further, it is not feasible to correct the point of engagement of the friction element in each frictional engagement means for the elimination of any change in the engaging or releasing speed of the friction element which may occur due to a variation in the stroke of a piston for the friction element, a temperature-dependent change in the fluidity of working oil, a deviation or time-dependent change in the frictional coefficient $\mu$ of the friction element, or the like. The above conventional technique is accompanied by a further problem, that is, if the frictional engagement means on the engaging side has a large torque capacity while its rotation speed is changing, a sudden speed change and a shift shock may take place due to its tie-up with the frictional engagement means on the releasing side.

SUMMARY OF THE INVENTION

With the foregoing in view, the present invention has as a primary object the provision of a control system for servo hydraulic pressure in an automatic transmission, which system can avoid occurrence of a shift shock at the time of a downshift by regulating the engaging pressure in accordance with input rotation from a time point preceding a synchronizing point and hence making appropriate transfer of torque transmission capacity from the frictional engagement means on the releasing side to the frictional engagement means on the engaging side.

To overcome the above problems, the present invention therefore provides a control system for servo hydraulic pressure in an automatic transmission provided with planetary gear mechanisms disposed between an input shaft and an output shaft so that shifting elements of the planetary gear mechanisms can be connected under control by servo hydraulic pressure to establish a different power flow in accordance with engagement or release of frictional engagement means and hence to achieve plural speed stages, comprising:

first and second frictional engagement means, one of said first and second frictional engagement means being released while the other is being engaged upon shifting from a particular speed stage to a speed stage lower than the particular speed stage;

change-over means for selecting feed or drain of servo hydraulic pressure which is adapted to engage or release said first and second frictional engagement means;

regulator means for regulating the hydraulic servo pressure;

an electronic control unit for controlling said regulator means;

first detector means for detecting input rotation and outputting to the electronic control unit a signal indicating the input rotation; and second detector means for detecting input torque and outputting to the electronic control unit a signal indicating the input torque;

wherein said regulator means is interposed between said change-over means and the engaged frictional engagement means, and is controlled to maintain the servo hydraulic pressure at a predetermined value under control of a first signal from the electronic control unit until predetermined input rotation is detected by said first detector means and then to gradually raise the servo hydraulic pressure under control of a second signal from the electronic control, on the basis of the value of input torque detected by the second detector means.

In the servo hydraulic pressure control system of the present invention constructed as described above, the pressure regulator means interposed between the change-over means and the frictional engagement means on the engaging side serves to maintain the servo hydraulic pressure at the predetermined value on the engaging side under the control of the signal from the electronic control unit until the predetermined input rotation is detected by the first detector means. A reduction in the servo hydraulic pressure on the releasing side can therefore be effected smoothly without being affected by the servo hydraulic pressure on the engaging side, thereby making it possible to avoid a sudden change in the input rotation and also tie-up of both frictional engagement means. Under the control of the signal from the electronic control unit on the basis of the value of input torque detected by the second detector means, the servo hydraulic pressure is then allowed to gradually increase at a predetermined rate of increment. This makes it possible to smoothly share torque, which is to be transmitted, by both the frictional engagement means and also to smoothly transfer the share of the torque from the frictional engagement means on the releasing side to the frictional engagement means on the engaging side.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENT

Figure 1:
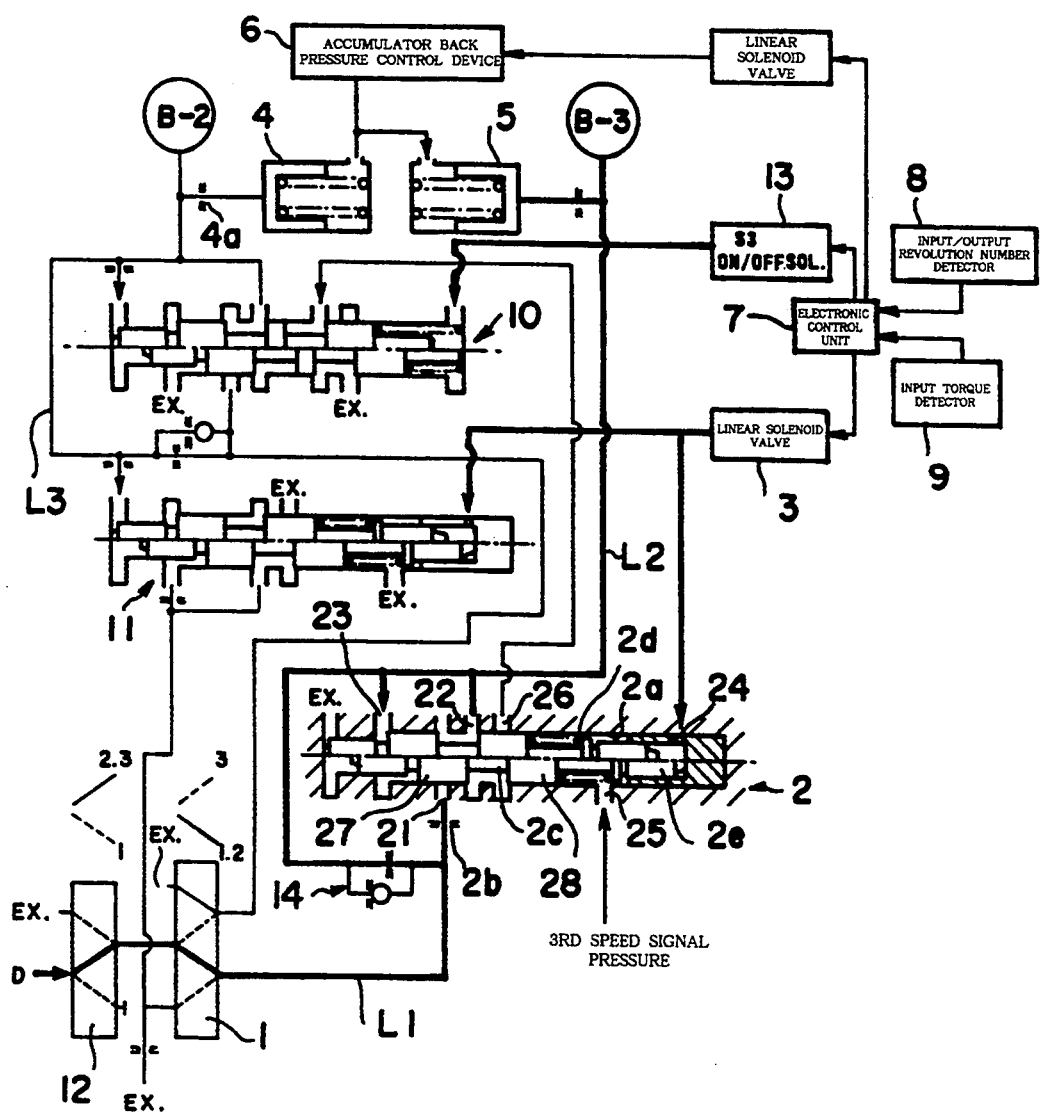
FIG. 1 is a circuit diagram of a hydraulic control circuit of an automatic transmission to which a servo hydraulic pressure control system according to one embodiment of the present invention has been applied.

The servo hydraulic pressure control system according to the one embodiment of the present invention will hereinafter be described with reference to the accompanying drawings. The automatic transmission to which the servo hydraulic pressure control system of this invention is applied is a five-speed automatic transmission. As is understood from FIG. 3, a 4-forward/1-reverse primary shifting unit M, composed of an in-line train of three planetary gears, is combined with an inlet-side overdrive planetary gear OD. First and second frictional engagement means which are alternatively brought into engagement upon shifting are a brake B-O, which engages only at the 3rd speed, and a brake B-3 which engages only at the 2nd speed.

Describing first the overall construction of the automatic transmission, it is provided, as in the conventional art, with the input-side overdrive planetary gear OD and the primary shifting unit M, in addition to a torque converter T equipped with a lockup clutch. The planetary gear mechanisms P are arranged between the input shaft I and the output shaft O in the primary shifting unit M. OD has a clutch C-O for connecting or disconnecting a carrier CO and a sun gear SO as well as the brake B-O for holding a one-way clutch F-O and the sun gear SO. The planetary gear mechanisms P are equipped with three sets of planetary gears P1,P2,P3 with individual shifting elements (sun gears, carriers, ring gears) being connected directly as needed. In association with the shifting elements of the individual planetary gears, clutches C-1,C-2, brakes B-1 to B-4 and one-way clutches F-1,F-2 are arranged. Although not shown in the drawing, the individual clutches and brakes (the frictional engagement means) are each provided, as in the conventional art, with servo means which has a piston which operates to engage or release the corresponding frictional engagement means, under control by servo control pressure.

Figure 3:
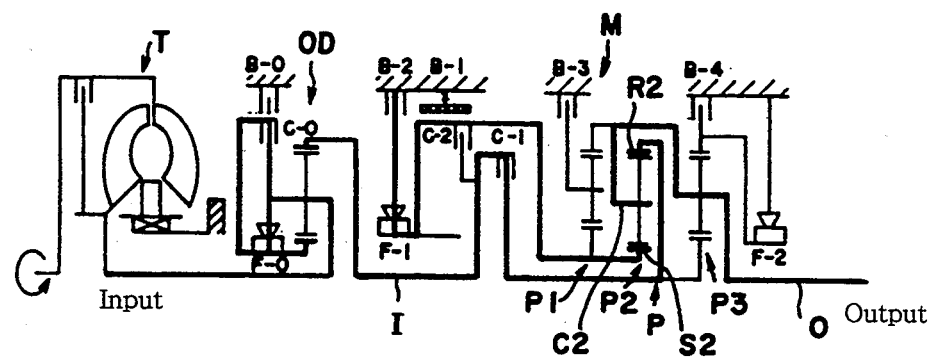
FIG. 3 is a schematic diagram showing a gear train of the automatic transmission, said gear train being in 3rd speed.
Figure 4:
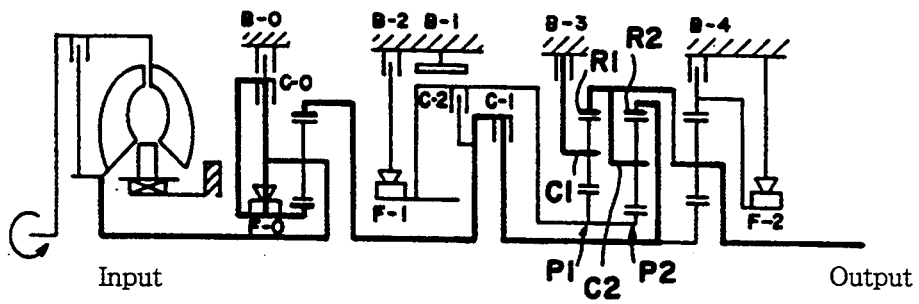
FIG. 4 is a schematic diagram showing the gear train of the automatic transmission, said gear train being in 2nd speed.

In the gear position of the automatic transmission as illustrated in FIG. 3, in which the clutch C-1 and the brake B-2 are both engaged and the remaining friction elements are released, rotation of the input shaft I, which also serves as an output shaft of the input-side overdrive planetary gear OD, is obtained as 3rd speed rotation at the output shaft O with a ring gear R2 of the planetary gear P2, a sun gear S2 and a carrier C2 serving as an input element, a reaction force element and an output element, respectively. In the gear position depicted in FIG. 4, in which the clutch C-1 remains engaged, the brake B-2 is engaged and the remaining friction elements are released, rotation of the output shaft I is obtained as 2nd speed rotation at the output shaft O with a carrier of the planetary gear P1 functioning as a reaction force element, while the carrier C2 of the planetary gear P2 and the ring gear R1 of the planetary gear P1 are connected directly with the planetary gear P2, both serving as output elements.

The hydraulic pressure control system of the automatic transmission is provided with means for regulating the servo pressure which is adapted to engage or release the friction elements of the brake B2 and brake B-3 in such a way that, upon shifting, one of the brakes is released and the other is engaged. This means comprises, as illustrated in FIG. 1, a 2-3 shift valve 1, a B-3 control valve 2, an SLU linear solenoid valve 3, a B-2 accumulator 4, a B-3 accumulator 5 and an accumulator back pressure control device 6. In addition, there are also provided an electronic control unit (ECU) 7 for outputting a control signal to the SLU linear solenoid valve 3 in accordance with the speed of rotation of the input shaft, an input/output revolution speed detector 8 for detecting the speed of input rotation to allow the electronic control unit 7 to output the control signal, and an input torque detector 9 for detecting input torque.

Describing the construction of each element in further detail, the B-3 control valve 2 which constitutes the regulator means is interposed in feed/drain lines L1, L2, which extend from the 2-3 shift valve 1 to the servo means for the brake B-3, in parallel with a checkball-fitted orifice 14. Formed in a cylinder wall defining a valve bore 2a of the B-3 control valve 2 are a feed/drain port 21 communicating with the feed/drain line L1 via a large-diameter orifice 2b, a feed/drain port 22 communicating with the feed/drain line L2, a feed/drain port 23 also communicating with the feed/drain line L2, and an input rotation signal port 24 fed with a signal hydraulic pressure which has been regulated by the SLU linear solenoid valve 3 under the control of a control signal from the ECU 7 in accordance with a detection signal from the input/output rotary speed detector 8. Incidentally, numerals 25,26 designate an input port for a 3rd speed signal pressure and a drain communication port, respectively.

A spool 2c fitted inside the valve bore 2a has a pair of lands 27,28 for controlling communication of the port 22 with the port 21 and a small-diameter land 29 extending from an end portion of the land 27. The land 28 is at one end thereof in contact with a pressure-receiving piston 2e via a spring 2d. An outer end of the land 28 forms a receiving face for pressure fed from the port 23.

An outer end face of the pressure-receiving piston 2e makes up a pressure-receiving face for a signal pressure from the input rotation signal port 24, while an inner end face of the pressure receiving piston 2e forms a pressure-receiving face for a signal pressure from the input port 25.

The B-2 accumulator 4 is connected via an orifice 4a to a line L3 which extends to the B-2 servo means. Like the B-3 accumulator 5 for the B-3 servo means, the drain pressure of the feed line L3 can be regulated even during drainage under the control of back pressure by the accumulator back pressure control device 6. In the drawing, numeral 10 designates a B-2 orifice control valve which constitutes a fast filling means. This fast filling means accelerates feeding of hydraulic pressure to the B-2 servo means at an initial stage of the feeding. Designated at numeral 11 is a 2-3 timing valve which takes a part in a shift from the 2nd speed to the 3rd shift. The 2-3 timing valve 11 regulates the drain pressure from the B-2 servo means by a signal from the SLU linear solenoid valve 3. Detailed description of these elements is however omitted herein because they do not take any direct part in the control of the B-3 servo pressure.

In the servo hydraulic control system constructed as described above, while operating in 3rd gear, drive range pressure D which has been fed through an unillustrated manual valve is fed to the B-2 servo means via the 1-2 shift valve 12, the 2-3 shift valve 1 and the feed/drain line L3. The brake B-2 is therefore in the engaged state. When an unillustrated shifting solenoid valve is actuated by a control signal from ECU 7 in accordance with the running conditions of the vehicle and the 2-3 shift valve 1 is changed over to the 2nd position (the intravalve oil passage is shown by solid lines), the hydraulic pressure of the B-2 servo means begins to be drained from the feed/drain line L3 and then through the 2-3 shift valve 1. In the illustrated embodiment, the drop of this drain pressure is controlled, as indicated in the range d in FIG. 5, until the input speed of rotation reaches a predetermined level, under the control of back pressure by the accumulator back pressure control device 15.

Figure 2:
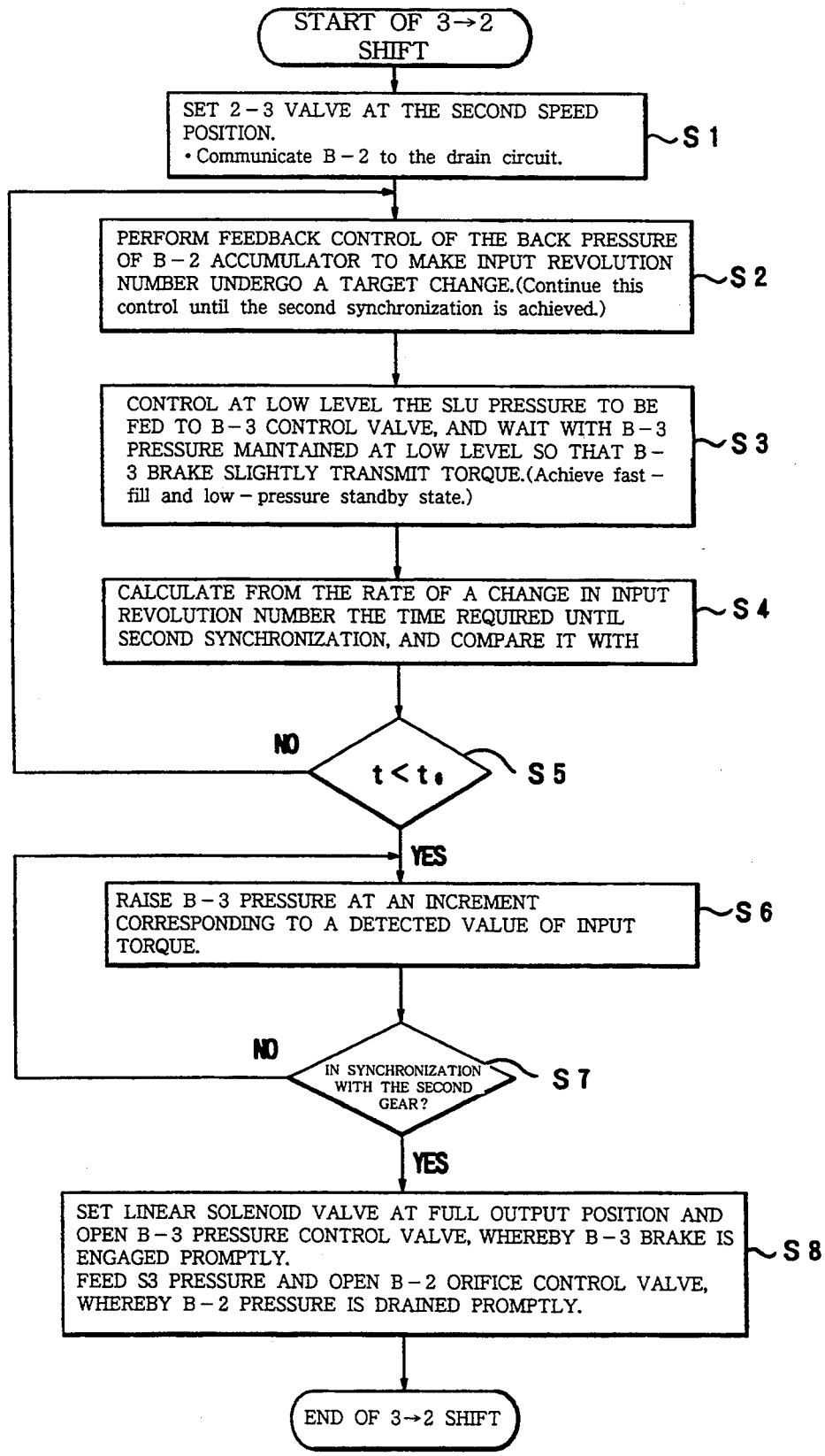
FIG. 2 is a flow chart for control of servo pressure by the servo hydraulic pressure control system.

The drive range pressure D is fed from the 2-3 shift valve 1 to the B-3 servo means via the feed/drain lines L1,L2. Feeding of pressure to the B-3 servo means is conducted by following the procedures of the flow chart shown in FIG. 2. The procedures will hereinafter be described based on FIG. 2 while referring to other drawings as needed. In step S1, under the control of an unillustrated shifting solenoid valve, the 2-3 shift valve 1 is brought into the communicating position shown by solid lines in FIG. 1, in which the B-2 servo means communicates with the drain circuit while the B-3 servo means communicates with the feed circuit. Here, as is shown in step S2, the back pressure of the B-2 accumulator 4 is feedback-controlled as described above so that the input speed of revolution undergoes a targeted change. This control is continued until a second speed synchronization is achieved (the range d in FIG. 5).

Figure 5:
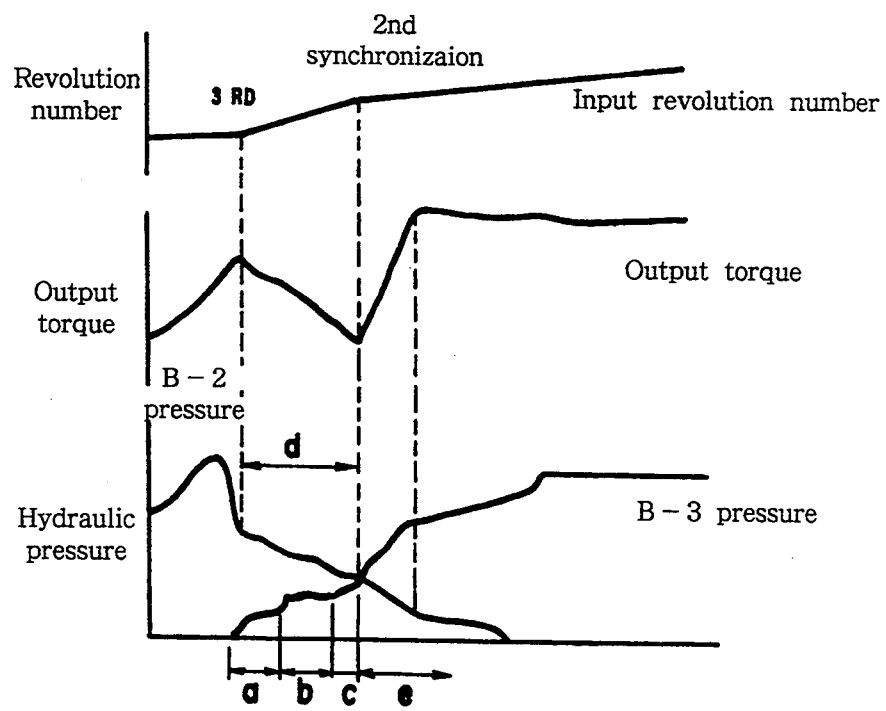
FIG. 5 describes speed, torque and pressure graphs of shift characteristics in a 3-2 shift of the automatic transmission.

During the above change in speed of revolution, in other words, until the synchronization at second speed is attained, the port 21 remains in communication with the port 22, because the spool 2c assumes the position shown in an upper half portion thereof in FIG. 1, by force of a spring in the B-3 control valve 2, in the range a shown in FIG. 5. Due to rapid supply of hydraulic pressure through the large-diameter orifice 2b, the piston of the B-3 servo means is caused to slide so that the piston is immediately displaced to a position where the friction element can be engaged, in other words, fast filling is performed.

In step S3, the signal pressure to be fed to the port 24 of the B-3 control valve 2 is controlled at a low level by the SLU linear solenoid valve 3. The signal pressure is therefore maintained in a standby state (the range b in FIG. 5) where the feed pressure (hereinafter called "B-3 pressure") to the B-3 servo means is kept low to allow the B-3 brake to transmit torque slightly. This is the control to avoid influence on the above-described change in the rotary speed. Omission of this control results in an abrupt change in rotary speed and tie-up of both the brakes, both because of an increase in the B-3 pressure. Any extra portion of the B-3 pressure in this range is released through the B-2 orifice control valve 10 since the port 26 is opened as a result of application of feedback pressure from the port 23. By the operation described above, a low-pressure, standby state is achieved.

The routine next advances to step S4, where the time t until the second speed synchronization is calculated at the ECU 7 from the rate of change in the input rotary speed and is compared with a preset value $t_o$. As long as t is not found to exceed $t_o$ in the above comparison, the routine returns from step S5 to step S2 so that the processing from step S2 to step S4 is repeated.

As soon as the value of the time t becomes less than the preset value $t_o$, the routine then advances to step S6 where the B-3 pressure is raised at a rate of increment corresponding to the value of input torque detected by the input torque detector 9 (range d 25 in FIG. 5). By this gradual pressure increase, both the brakes B-2 and B-3 are brought into such positions that they jointly share the bearing of the torque, thereby making it possible to achieve a smooth change to the point of synchronization by variations in their torque shares. This state is continued until synchronization with the second gear speed is confirmed in the next step S7.

When the synchronization is confirmed eventually, the SLU linear solenoid valve is set at a full output position in step S8 so that the port 21 of the B-3 control valve 2 is brought into such an open state as being fully communicated with the port 22. As a result, the B-3 brake is promptly engaged. By a signal pressure fed from the solenoid valve 13, on the other hand, the B-2 orifice control valve 10 is opened so that the B-2 pressure is drained promptly (the range e in FIG. 5). By the series of steps described above, the 3-2 shift is completed. In the manner described above, the engaging pressure is regulated stepwise in the system of the above embodiment until the synchronization with the second gear is attained.

The present invention has been described in detail based on one embodiment in which the present invention was applied to a five-speed automatic transmission. It is to be noted that apparatuses to which the present invention can be applied are not limited to such automatic transmissions. Further, the specific construction of each element is not limited to the one described above. It is possible to adopt, for example, such a construction that the engaging pressure is directly controlled by electrical signals while using the B-3 control valve as the pressure regulator for the actuation of the linear solenoid.

We claim:

1. A control system for an automatic transmission having a planetary gear mechanism disposed between an input shaft and an output shaft and first and second fictional engagement elements, said first frictional engagement element being released while said second frictional engagement element is engaged upon downshift from a given speed stage to another speed stage, said control system comprising:

a first hydraulic servo for engaging the first frictional engagement element;

a second hydraulic servo for engaging the second frictional engagement element;

change-over means for selectively feeding or draining servo hydraulic pressure to/from the first and second hydraulic servos;

regulator means for regulating the hydraulic servo pressure of the second hydraulic servo, said regulator means being interposed between said change-over means and the second hydraulic servo;

first solenoid valve means for controlling said regulating means;

first detecting means for detecting input rotational speed of the planetary gear mechanism; and an electronic control unit for outputting control signals to the first solenoid valve means, in accordance with the detected input rotational speed, said electronic control unit including:

calculating means for calculating, responsive to initiation of draining of said first hydraulic servo, a time t remaining until synchronization of the another speed stage, on the basis of the rate of change in the detected input rotational speed;

first signal outputting means for outputting a first signal to the first solenoid valve means to keep the hydraulic pressure to the second hydraulic servo at a constant low level when said time t calculated by the calculating means is more than a predetermined time $t_o$;

second signal outputting means for outputting a second signal to the first solenoid valve means to gradually raise the hydraulic pressure to the second hydraulic servo when said time t calculated by the calculating means is less than the predetermined time $t_o$; and third signal outputting means for outputting a third signal the first solenoid valve means to rapidly raise, at a rate higher than the gradual raise, the hydraulic pressure to the second hydraulic servo when the synchronization of the another speed stage is confirmed.

2. The control system of claim 1, further comprising: second detecting means for detecting input torque to the automatic transmission, said second signal outputting means outputting the second signal for gradually raising the hydraulic pressure of the second hydraulic servo in accordance with the detected input torque.

3. The control system of claim 1, wherein said second frictional engagement element slightly transmits torque at said constant low level hydraulic pressure.

4. The control system of claim 1, further comprising:

a accumulator connected to the first hydraulic servo and having a back pressure chamber;

accumulator back pressure control means, connected to the back pressure chamber, for controlling the hydraulic pressure of the first hydraulic servo, and second solenoid valve means for controlling the accumulator back pressure control means;

said electronic control unit outputting control signals to the first and second solenoid valve means in accordance with the detected input rotational speed and further including fourth signal outputting means for outputting a fourth signal to the second solenoid valve means for controlling the back pressure of the back pressure chamber to make the input rotational speed undergo a targeted change until the synchronization of the another speed stage is confirmed.

* * * * *